INVENTORS
VERNON H. ASKE
ARTHUR D. GLICK

INVENTORS
VERNON H. ASKE
ARTHUR D. GLICK

July 3, 1962 V. H. ASKE ETAL 3,041,883
TRANSDUCER FOR A PENDULOUS GYROSCOPIC ACCELEROMETER
Filed Nov. 19, 1958 4 Sheets-Sheet 4

INVENTORS
VERNON H. ASKE
ARTHUR D. GLICK
BY Roger W. Jensen
ATTORNEY

United States Patent Office 3,041,883
Patented July 3, 1962

3,041,883
TRANSDUCER FOR A PENDULOUS GYROSCOPIC ACCELEROMETER
Vernon H. Aske, Hopkins, and Arthur D. Glick, Roseville, Minn., assignors to Minneapolis-Honeywell Regulator Company, Minneapolis, Minn., a corporation of Delaware
Filed Nov. 19, 1958, Ser. No. 774,952
7 Claims. (Cl. 73—504)

This invention is directed to a means for measuring the sense and magnitude of relative movement between a pair of members. The invention comprises in part a binary code wheel or member positioned on one of the relatively moving members and a dual zone complementary mask mounted on the other relatively moving member. The binary code member is characterized by its ability to transmit light and has on one surface thereof a large number of finely divided graduations which are opaque, these opaque sections being spaced apart by equal increments, the clear sections defined between the opaque sections being substantially the same width as the opaque sections. The dual zone complementary mask is also characterized by its ability to transmit light and has two zones of spaced opaque sections both of which are substantially identical in width and in spacing to the opaque sections on the binary code member, the zones being offset or displaced from one another by one-fourth of an interval, an interval being defined as the total width of one opaque section and an adjacent clear section. The invention further includes means for simultaneously illuminating a substantial number of intervals on the binary code member. The invention also includes a pair of light sensitive devices such as photo transistors positioned adjacent to the complementary mask member and with one of the light sensitive devices being aligned with one of the zones on the mask and the other light sensitive device being aligned with the other zone on the mask.

The invention as above described will cause the combined light sensitive devices to have four different states of illumination for each interval of relative movement between the pair of relatively movable members. Thus, an extremely accurate pickoff device is provided because the individual intervals can be themselves of a very small dimension by using a suitable process such as photo-engraving. By the invention providing four different states of illumination for each interval it follows that the resolution of the device is increased as compared to prior art devices. Further, by having this arrangement the sense of relative movement between the pair of relatively movable members can be detected and accordingly a convenient method of integrating or measuring the total net movement between a pair of members is provided.

The invention has been shown applied to the turntable of a pendulous gyro accelerometer wherein the unique combination of the accelerometer and the pickoff provides a means for very accurately measuring and reading out the integral of acceleration imparted to the device.

An object of the present invention therefore is to provide an improved control apparatus.

A further object of this invention is to provide an improved pendulous gyro accelerometer.

A further object of the invention is to provide an improved means for measuring the sense and amount of relative movement between a pair of relatively movable members.

These and other objects will become more apparent from a reading of the accompanying specification and claims accompanied by the drawings in which:

Figure 11:
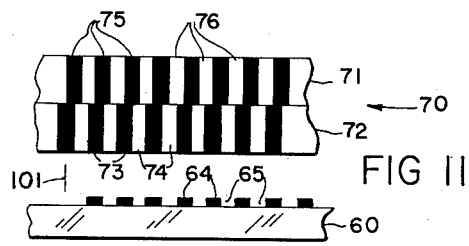
Figure 12:
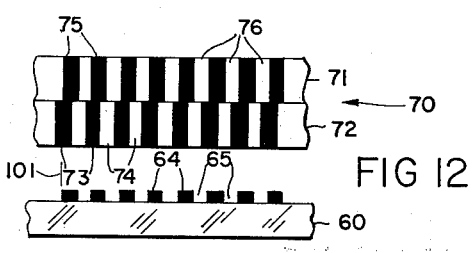
Figure 13:
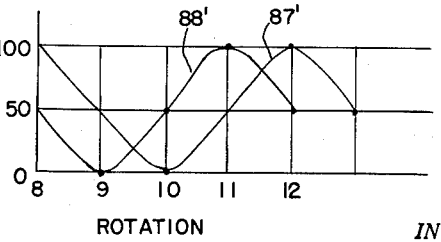

FIGURES 8, 9, 10, 11, and 12 show the relationship between the binary code wheel or ring and the dual zone complementary mask for different relative positions therebetween; and FIGURE 13 is a plot of the outputs of the light sensitive devices associated with each of the two zones of the complementary mask illustrating how the outputs thereof vary as a function of relative movement between the binary code member and the dual zone mask and further how the outputs are out of phase with one another.

Figure 3:
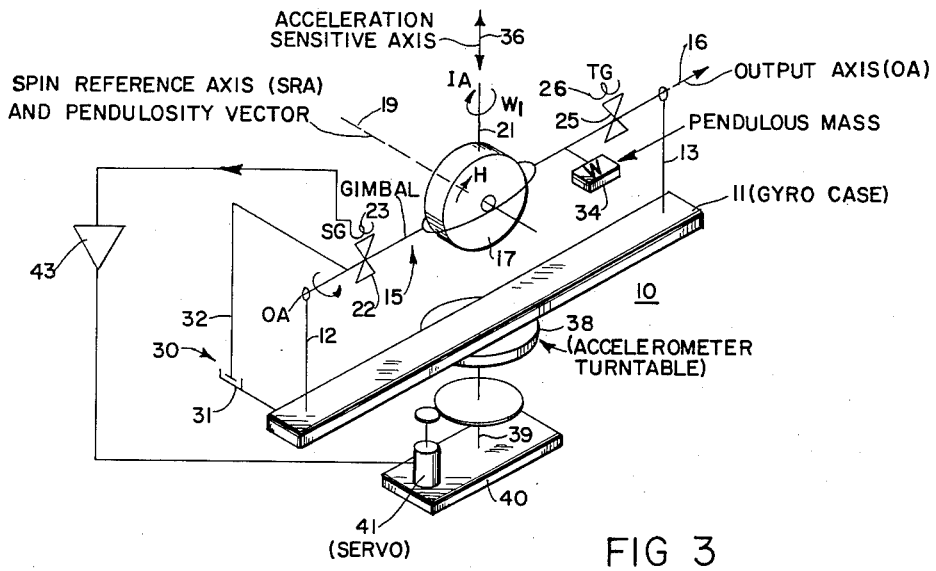
FIGURE 3 is a somewhat schematic representation of a pendulous gyro accelerometer.

The operating principles of the pendulous gyro accelerometer can be described best with reference to FIGURE 3 wherein the reference numeral 10 generally identifies the pendulous gyro accelerometer, or PGA. The acceleration sensing element of the PGA is a floated integrating gyro having a pendulous gimbal. The gyro per se may well be of the type shown in the Jarosh et al. Patent 2,752,791, issued July 3, 1956.

The gyro case per se is identified by reference numeral 11 and supports by a pair of suitable bearing means 12 and 13 a gimbal assembly generally identified by reference numeral 15. The gimbal assembly 15 is supported on bearing means 12 and 13 for rotation about an output axis (OA) 16 and an element of the gimbal assembly is a gyro rotor element 17 supported by suitable means and adapted to be spun by suitable means for rotation about a spin reference axis 19 which is perpendicular to the output axis 16. The gyro input axis (IA) identified by reference numeral 21 is an axis perpendicular to both the spin reference axis 19 and the output axis 16 and, as is well understood by those skilled in the art, rotation of the entire gyro case 11 about the gyro input axis 21 will result in precession of the gyro about its output axis 16.

A signal generator means including a rotor element 22 attached to the gimbal assembly 15 and a field element 23 attached to the case provides a means for sensing relative movement between the gimbal assembly and the gyro case. In addition a torque generator including a rotor element 25 attached to the gimbal assembly and a winding element 26 attached to a case provides a means for imparting demand signals or inputs to the gyro and is effective to rotate the gimbal assembly 15 relative to the case. The signal generator means and torque generator means may be of any suitable type and may be generally of the type shown in the Mueller Patent 2,488,734, issued November 22, 1949.

Normally the gimbal assembly 15 is floated in a viscous fluid which provides the two functions of supporting the gimbal assembly in substantially neutral suspension thus permitting delicate bearings and further provides a viscous restraint against rotation of the gimbal assembly relative to the case. The support of the gimbal assembly 15 by the fluid and the viscous damping of the gimbal assembly is represented schematically in FIGURE 3 by the supports 12 and 13 and by a damper generally identified by a reference numeral 30 which includes an element 31 attached to the gyro case 11 and an element 32 connected to the gimbal assembly 15.

The gyroscopic apparatus described above is generally similar to that shown in the aforementioned Jarosh et al. patent. In addition a pendulous mass 34 is added to the gimbal assembly. As shown in FIGURE 3 the pendulous mass 34 is positioned on the gimbal assembly 15 so that its pendulosity vector is aligned with the spin reference axis 19. With this arrangement the gimbal assembly is affected by accelerations along the acceleration sensitive axis which is parallel with the input axis 21 of the gyro. It will be understood therefore that accelerations along the acceleration sensitive axis will react with the pendulous mass 34 to impart a torque to the gimbal assembly tending to rotate the entire gimbal assembly about the output axis 16.

As shown, the entire gyro case is mounted on an accelerometer turntable 38 which is in turn journalled by suitable means for rotation about a turntable axis 39 on a main base or housing 40. A motor 41 is connected between the turntable 38 and the housing 40 and is adapted, when energized, to cause the turntable to rotate relative to the housing about the turnable axis 39. It will be noted that the turntable axis 39 is parallel to the acceleration sensitive axis 36 and the gyro input axis 21. An amplifier of suitable type 43 is operatively connected between the signal generator output winding 23 and the motor 41.

To summarize the discussion thus far, the gyro is mounted on the accelerometer turntable so that the gyro input axis 21 is parallel to the turntable axis 39. The axis of gyro gimbal unbalance or pendulosity vector is parallel to the gyro spin reference axis 19. The acceleration sensitive axis of the device is therefore parallel to the gyro input axis and the accelerometer turntable axis. An acceleration along the sensitive axis acts on the floated pendulum gimbal to cause an inertial reaction torque about the gyro output axis. The resulting gimbal deflection is detected by the gyro signal generator whose electrical output is amplified by amplifier 43 and applied to the servomotor 41 which drives the accelerometer turntable through the gear train means shown at an angular velocity such that the resulting gyro precessional torque exactly rebalances the inertial reaction torque. An increase of applied acceleration causes the gyro gimbal to deflect further, which, in turn, increases the signal generator output; the increased signal to the servomotor causes the turntable to rotate faster so that the gyro precessional torque is increased to exactly balance the increased inertial reaction torque. It can be shown that the time integral of acceleration applied to the gyroscope, which is velocity, is proportional to the angular displacement of the PGA turntable. It then becomes important to be able to measure accurately the total turntable rotation relative to the base 40 so as to accurately measure the velocity of the craft upon which the PGA is mounted.

Analog pickoffs such as multi-turn potentiometers are provided for measuring the turntable rotation. In some applications it is desirable to be able to express the velocity output in digital form. The present invention provides an improved digital pickoff in combination with a PGA which gives greater system accuracy and flexibility.

Figure 1:
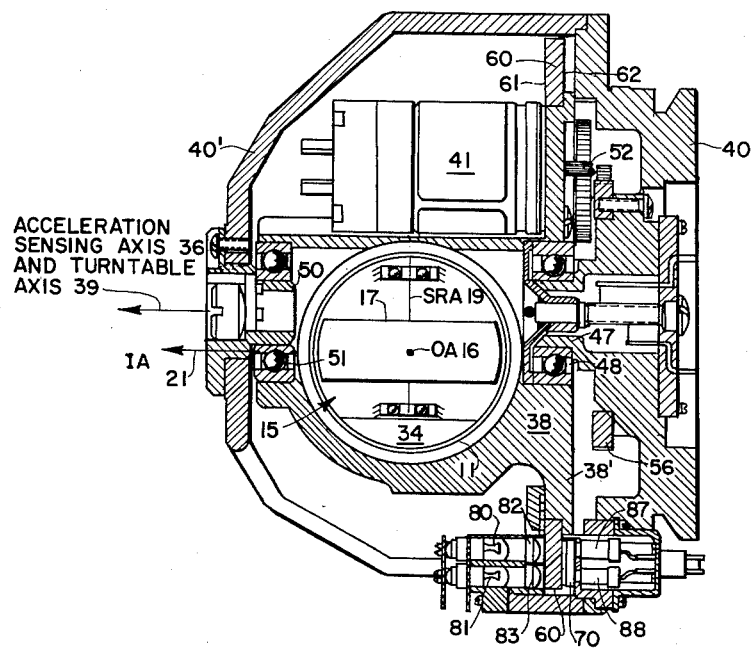
FIGURE 1 is a cross-sectional view of a pendulous gyro accelerometer embodying the improved pickoff.

Referring to FIGURE 1, the PGA 10 is shown in greater detail and similar reference numerals are used to identify parts or elements that are equivalent to that shown in FIGURE 3. The main base or frame 40 is a generally flat circularly shaped member cooperating with a hollow cup-like cover element 40', these two elements defining an enclosure. Base member 40 includes a central hub portion 47 upon which is mounted the inner race of a bearing 48, the outer race of which supports one end of the accelerometer turntable 38. The cup-like cover element 40' has a central hub portion 50 upon which is mounted the inner race of a suitable bearing 51, the outer race of which fits into a suitable recess in the turntable 38 to support the same for rotation. The axes of bearing means 48 and 51 are aligned and collectively define the turntable axis 39. The pendulous gyro including case element 11 is mounted on the turntable 38. The mounting is such that the input axis 21 which of course is perpendicular to both the output axis 16 and the spin reference axis 19 is either aligned or parallel with the platform axis 39. The pendulous mass 34 again is eccentrically positioned relative to the input axis 21 so that accelerations parallel or aligned with the input axis 21 will result in the gimbal assembly 15 rotating about the output axis 16.

Figure 2:
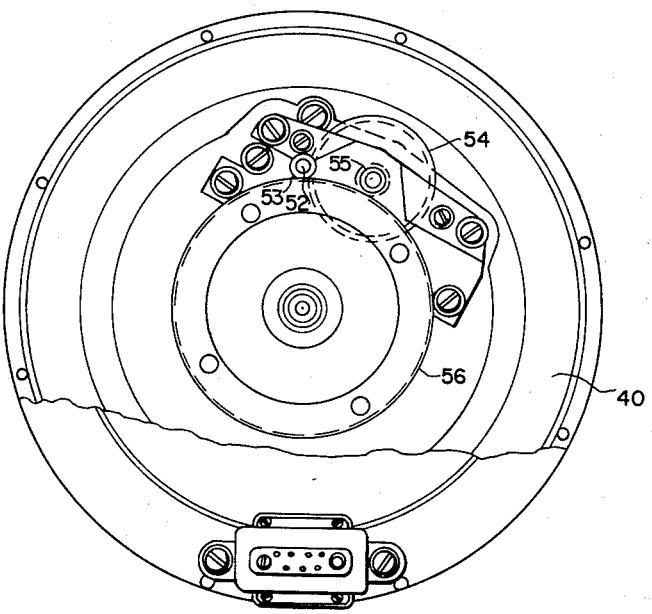
FIGURE 2 is an end view of the apparatus shown in FIGURE 1 with part of the housing removed.

It will be noted that the turntable 38 has a flange portion 38' of a considerable diameter integral therewith which flange provides a mounting base or support for the servomotor 41, the output shaft 52 of which is shown in FIGURE 2 has a pinion gear 53 which in turn meshes with an idler gear 54 suitably journalled and which is integral with a pinion gear 55 which in turn meshes with a fixed ring gear 56 which is securely attached to the main base 40. It will be understood that rotation of the servomotor 41 imparts rotation to the turntable 38 relative to the base 40 through the coaction of gears 53, 54, 55, and 56.

Figure 4:
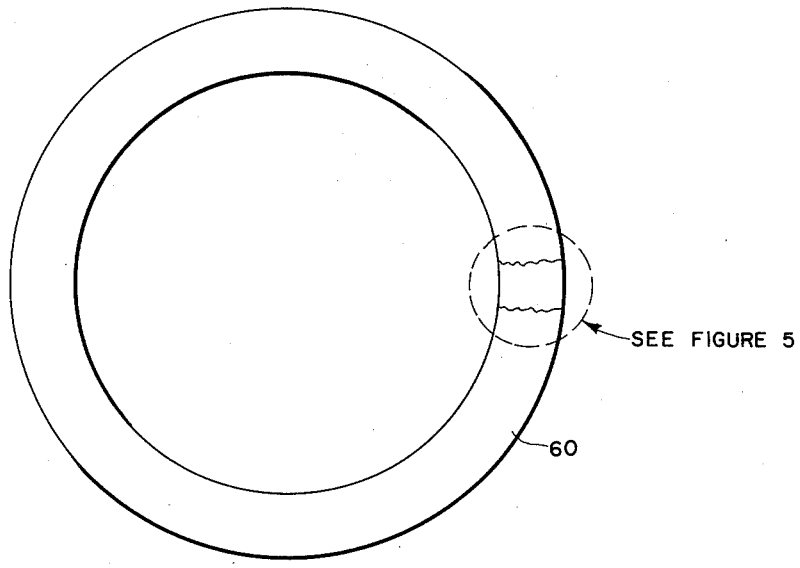
FIGURE 4 is an end view of the binary code wheel or transparent ring member forming a part of the unique pickoff.
Figure 5:
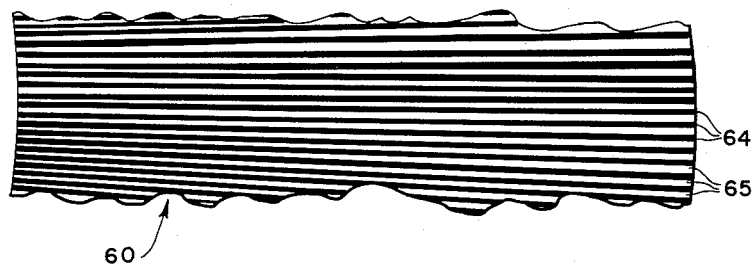
FIGURE 5 is an enlarged or detailed view of a part of the ring shown in FIGURE 4.
Figure 7:
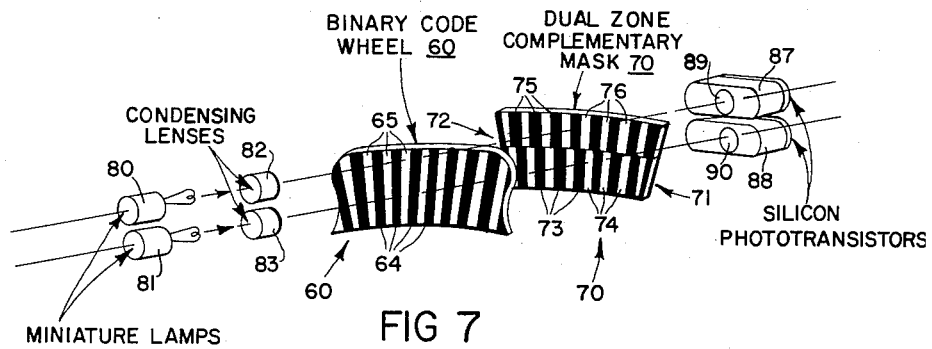
FIGURE 7 is an exploded view showing the relationship between the various elements of the unique pickoff.

The digital pickoff for measuring the sense and magnitude of displacement of the turntable 38 relative to the housing 40 includes an annular ring or binary code wheel or member 60 clamped or otherwise suitably secured to the flange portion 38' of the turntable. The ring 60 is mounted concentrically with the turntable axis 39. Ring 60 is shown in greater detail in FIGURES 4 and 5 and is characterized by being made out of a suitable light transmitting material such as high grade optical glass or the like. The ring 60 is shown in FIGURE 1 in cross section and it will be noted that it has two axial ends 61 and 62. Axial end or surface 61 has applied thereto by suitable means such as photoengraving a large number of opaque radial lines 64. The enlarged detail shown in FIGURE 5 illustrates this feature and the lines are further shown in FIGURE 7. In FIGURE 7 it will be noted that the opaque lines 64 are disposed substantially equal angularly about the platform or turntable axis 39. The opaque lines or sections 64 are spaced apart by clear sections 65 having substantially the same angular width as the opaque sections 64. By using a photoengraving process a very large number of opaque radial lines may be disposed about the ring member 60. For example, with a ring having an outer diameter of approximately 4 inches it is not difficult at all to provide 2048 clear and 2048 opaque radial lines on the axial surface 61 of the ring 60.

Figure 6:
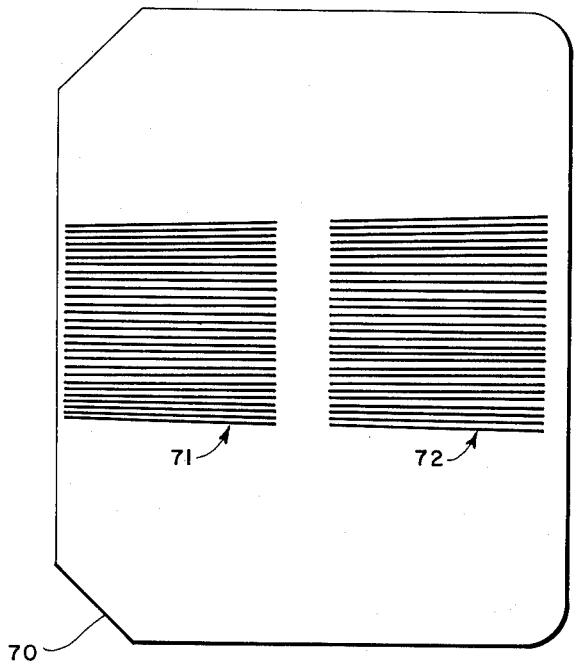
FIGURE 6 is an enlarged side view of the dual zone complementary mask forming a part of the unique pickoff.

The digital pickoff further includes a dual zone complementary mask member 70 which is adjustably mounted by suitable means on the main base 40. The mask member 70 is a generally flat shaped piece characterized by having light transmitting characteristics and is made out of a suitable material such as high grade optical glass. The member 70 as shown in FIGURE 1 is mounted on base 40 so as to be positioned adjacent to but slightly spaced from the axial surface 62 of the ring 60. The dual zone complementary mask 70 is shown in greater detail in FIGURE 6 as well as in the exploded diagram FIGURE 7 and it will be noted that two zones or groups 71 and 72 of opaque radial lines or sections are provided. More specifically, referring to FIGURE 7, zone 71 includes a plurality of opaque radial lines or sections 73 spaced apart by clean sections 74. Further, the zones 72 comprises a plurality of opaque lines or sections 75 spaced apart by a plurality of clear sections 76. Generally speaking, the opaque sections 73 and 75 are substantially similar in spacing and in angular width to the spacing and angular width of the opaque sections 64 on the binary code wheel or ring 60. All of the opaque sections are radial with respect to the turntable axis 39. It will be further noted that the opaque sections 73 in zone 71 are offset or displaced from the opaque section 75 in zone 72 by an amount substantially equal to one-fourth of the total width of one opaque section and one clear section, this total width also being identified as an interval (see FIGURE 8). The importance of having zone 71 offset from zone 72 by one-fourth of an interval will become understood below.

The digital pickoff further includes a suitable source of light shown herein to be a pair of miniature lamps 80 and 81 suitably mounted on base 40 and aimed so as to project their light rays, when energized, into a pair of condensing lenses 82 and 83 which serve the function of providing parallel light rays 100 to be applied to the axial surface 61 of the binary code ring 60.

The digital pickoff further includes a pair of light sensitive devices such as silicon photo transistors 87 and 88 having light sensitive areas 89 and 90 respectively and mounted by suitable means on base 40 and positioned adjacent to the side of the mask member 70 opposite from the side which is adjacent to surface 62 of ring 60. It will be understood that the light rays emanating from light sources 80 and 81 will be projected through condensing lenses 82 and 83, through the clear sections 65 of the binary code ring 60 and under certain conditions through the clear sections 74 and 76 of zones 71 and 72 of the complementary mask 70 so as to fall upon the light sensitive areas 89 and 90 of the light sensitive devices 87 and 88 respectively.

Figure 8:
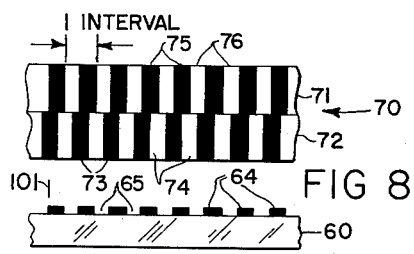

It will be understood that as the turntable 38 rotates relative to the housing 40 the light beams 100 will be modulated by the coaction between the opaque sections 73 and 75 with the opaque sections 64 on the ring 60. FIGURES 8 through 12 show the four different states of illumination on the photo transistors 87 and 88 depending upon the relative angular positions between the code wheel 60 and the mask 70. In FIGURES 8 through 12, for purposes of clarity, ring member 60 is shown on edge while the end surface of the mask 70 is shown. It will be understood that normally and as shown in FIGURES 1 and 7 the end surface of mask 70 is positioned adjacent to the axial surfaces of the ring 60. In FIGURE 8 it will be noted that the total width of one clear section and one opaque section is identified as 360° or one interval. In FIGURE 8 it will be noted that the opaque sections 64 on ring 60 are substantially aligned with the opaque sections 75 of zone 71 of the mask 70. As a corollary it follows that the clear sections 65 of ring 60 would be aligned with the clear sections 76 of zone 71 of mask 70. It follows therefore that a maximum amount of light 100 is at this instant passing through the clear sections 76 of zone 71 of mask 70 and falling on the light sensitive area 89 of device 87. However, at the same time due to the 90° phase shift between zones 71 and 72 on mask 70 it follows that the opaque sections 64 of ring 60 are screening off half of the clear section 74 of zone 72. Accordingly, at this time only 50% of the maximum possible light is falling on the light sensitive area 90 of device 88.

Figure 9:
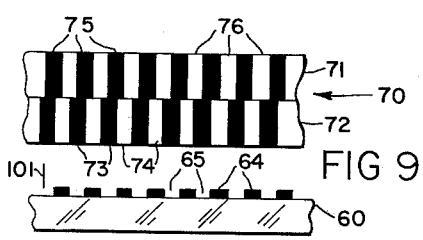

FIGURE 9 depicts the elements with ring member 60 being rotated or moved to the right 90° from the position shown in FIGURE 8. The initial position of ring member 60 is identified by reference numeral 101. In this position the opaque sections 64 of the ring 60 completely screen off the clear sections 74 in zone 72 so that no light is projected on light sensitive area 90 of the device 88. Also, at this time, the opaque sections 64 on ring 60 screen off half of the clear sections 76 of zone 71 on the mask 70.

Figure 10:
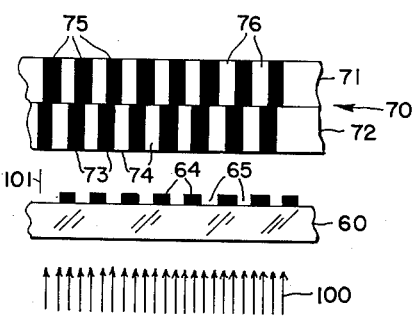

FIGURE 10 shows the elements 60 and 70 90° displaced from the position shown in FIGURE 9, that is with element 60 shifted 90° further to the right from the position shown in FIGURE 9. In this position, the opaque sections 64 on the ring 60 completely mask or obscure the clear sections 76 of zone 71 of the mask 70 while the opaque sections 64 screen only half of the clear sections 74 in zone 72.

FIGURE 11 depicts element or ring 60 displaced 90° further to the right from the position shown in FIGURE 10 and it will be noted that in this position the opaque sections 64 on the ring 60 screen half of the clear sections 76 in zone 71 and are completely aligned with the opaque sections 73 in zone 72 thus permitting a maximum amount of light to pass through clear section 74 of zone 72 so as to fall upon light sensitive area 90 of the device 88.

FIGURE 12 shows the element 60 displaced 90° to the right from the position as shown in FIGURE 11 which brings it back to the position corresponding to FIGURE 8. Again, in this state a maximum of light is passing through the clear section 76 of zone 71 while only 50% of the maximum light is passing through the clear section 74 of zone 72.

It will therefore be understood that for each interval on the ring 60, which as indicated above, are very finely divided, there will be four distinct states of illumination of the photo transistors 87 and 88.

The four distinct states of illumination of photo transistors 87 and 88 are depicted in FIGURE 13 wherein the output of transistors 87 and 88 is identified by reference numerals 87' and 88', these outputs being plotted as a function of rotation. It will be noted that outputs 87' and 88' fluctuate between a minimum level of zero to a maximum level of 100. It will be noted that at position 8 corresponding to FIGURE 8 output 87' is at a maximum of 100 while output 88' is at the midpoint of 50. Further, at position 9 corresponding to FIGURE 9 output 88' is at a minimum while output 87' is at a 50% level. At position 10 corresponding to FIGURE 10, output 87' is at a minimum while output 88' is at the 50% level. Further, at position 11 corresponding to FIGURE 11 output 88' is at a maximum level of 100 while output 87' is at the midpoint of 50. It will be observed that the outputs 87' and 88' are in effect displaced 90 electrical degrees from one another, a complete interval of one opaque section 64 and one clear section 65 constituting an interval. It will be clear to those skilled in the art that with this type of output the sense of relative rotation between elements 60 and 70 can be determined as well as the magnitude of relative rotation therebetween. Further, since four distinct states of operation of the photo transistors 87 and 88 are obtained for a single interval on the ring 60 it follows that a much greater accuracy or resolution is possible. For example, it was above indicated that in one ring 2048 clear and 2048 opaque radial lines were photo engraved on a ring having a diameter of approximately four inches. It follows therefore that by getting four states of illumination on the two photo transistors that a resolution of 158 arc seconds of turntable rotation is obtained. The particular circuitry such as logic circuits which would be used with the output from transistors 87 and 88 are not disclosed in the present application since they form no part of the present invention. However, such circuits are well known to those skilled in the art.

An important aspect of the present invention is the feature of illuminating simultaneously a large number of intervals on ring 60. This gives a substantial light input to the light sensitive means 87 and 88 so that they may effectively function and provide an accurate output in contrast to the relatively low level and inaccurate signal obtained from a means passing light through a single slit or clear section or the like. Any errors in laying out the opaque sections are averaged out in the present device giving it an extremely high accuracy.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What we claim is:

1. A pendulous gyro accelerometer of the class described comprising: a base, a turntable rotatably mounted for unlimited rotation about a first axis on said base; a pendulous gyro having mutually perpendicular spin reference, output, and input axes positioned on said turntable so that said input axis is parallel to said first axis; means for providing a signal indicative of movement of said gyro about said output axis away from an initial position; motor means connected between said turntable and said base, and adapted when energized to rotate said turntable relative to said base; means for energizing said motor means with a signal indicative of the signal from said signal producing means, said energization of said motor means causing said turntable to rotate about said first axis thus rotating said gyro about said input axis, the sense of rotation about said input axis being such that said gyro tends to be precessed about said output axis toward said initial position; and means for measuring the direction and magnitude of rotation of said turntable relative to said base including a transparent annular ring on said turntable mounted substantially concentric with said first axis, a plurality of opaque radial sections disposed at substantially equal angular increments about said ring, each opaque section being adjacent to a clear section of substantially the same angular width, a transparent complementary mask on said base positioned with a first surface thereof adjacent to one axial surface of said ring, a first and a second zone of opaque sections substantially identical in angular width and in spacing to said opaque sections of said ring on said mask, said zones being offset from one another by one-fourth of the interval defined by an opaque section and an adjacent clear section, a pair of light sensitive devices on said base positioned adjacent to a surface of said mask opposite to said first surface of said mask with one device being aligned with one of said zones and the other device being aligned with the other of said zones, and a source of light mounted on said base adapted to illuminate a plurality of said intervals on said ring simultaneously.

2. A pendulous gyro accelerometer of the class described comprising: a base, a turntable rotatably mounted for rotation about a first axis on said base; a pendulous gyro having mutually perpendicular spin reference, output, and input axes positioned on said turntable so that said input axis is parallel to said first axis; means for providing a signal indicative of movement of said gyro about said output axis away from an initial position; motor means connected between said turntable and said base and adapted when energized to rotate said turntable relative to said base; means for energizing said motor means with a signal indicative of the signal from said signal producing means, said energization of said motor means causing said turntable to rotate about said first axis thus rotating said gyro about said input axis, the sense of rotation about said input axis being such that said gyro tends to be precessed about said output axis toward said initial position; and means for measuring the rotation of said turntable relative to said base including a light transmitting member on said turntable, a plurality of opaque sections disposed at substantially equal angular increments about said light transmitting member, each opaque section being adjacent to a clear section, a light transmitting complementary mask on said base positioned with a first surface thereof adjacent to a surface of said member, a first and a second zone of opaque sections on said mask substantially identical in angular width and in spacing to said opaque sections of said member, said zones being offset from one another by a friction of the interval defined by an opaque section and an adjacent clear section, a pair of light sensitive devices on said base positioned adjacent to said mask with one device being aligned with one of said zones and the other device being aligned with the other of said zones, and a source of light mounted on said base adapted to illuminate simultaneously a plurality of said intervals on said member.

3. A pendulous gyro accelerometer of the class described comprising: a base, a turntable rotatably mounted for rotation about a first axis on said base; a pendulous gyro having mutually perpendicular spin reference, output, and input axes positioned on said turntable so that said input axis is parallel to said first axis; means for providing a signal indicative of movement of said gyro about said output axis away from an initial position; motor means connected between said turntable and said base and adapted when energized to rotate said turntable relative to said base; means for energizing said motor means with a signal indicative of the signal from said signal producing means; and means for measuring the direction and magnitude of rotation of said turntable relative to said base including a first member and a second member, said first member being mounted on said turntable for rotation therewith about said first axis, a second member mounted on said base adjacent to said first member, a plurality of opaque and clear sections disposed at substantially equal angular increments about one of said members concentrically with said first axis, a first and a second zone of opaque sections on the other of said members substantially identical in angular width and in spacing to said plurality of opaque and clear sections of said one of said members, said zones being offset from one another by one-fourth of the interval defined by an opaque section and an adjacent clear section, light sensitive means positioned adjacent to said other of said members, and light producing means adapted to illuminate simultaneously a plurality of said intervals on said one of said members.

4. A pendulous gyro accelerometer of the class described comprising: a base, a turntable rotatably mounted on said base for unlimited rotation about a first axis; a pendulous gyro having a gimbal and a rotating inertia element and mutually perpendicular spin reference, output, and input axes positioned on said turntable so that said input axis is normally parallel to said first axis; means for providing a signal indicative of movement of said gimbal about said output axis away from an initial position; motor means connected between said turntable and said base and adapted when energized to rotate said turntable relative to said base; means for energizing said motor means with a signal indicative of the signal from said signal producing means, said energization of said motor means causing said turntable to rotate about said first axis thus rotating said gyro about said input axis, the sense of rotation about said input axis being such that said gyro tends to be precessed about said output axis toward said initial position; and digital pickoff means for producing a signal indicative of the direction and magnitude of rotation of said turntable relative to said base including a transparent circular member on said turntable mounted substantially concentric with said first axis, a plurality of opaque and clear sections alternately disposed at substantially equal angular increments about said member, said sections being of substantially the same angular width, a transparent complementary mask on said base positioned with a first surface thereof adjacent to one axial surface of said member, a first and a second zone of opaque sections on said mask substantially identical in angular width and in spacing to said opaque sections of said member, said zones being offset from one another by one-fourth of the interval defined by an opaque section and an adjacent clear section, a pair of light sensitive devices on said base positioned adjacent to a surface of said mask opposite to said first surface of said mask with one device being aligned with one of said zones and the other device being aligned with the other of said zones, and a source of light mounted on said base adapted to illuminate a plurality of said intervals on said member simultaneously.

5. Means for measuring relative rotation between a pair of members supported for relative movement with respect to one another, said measuring means comprising a ring on the first of said members adapted to rotate therewith, said ring having light transmitting characteristics; opaque sections disposed at substantially equal angular increments about said ring; a dual zone complementary mask on the other of said members positioned adjacent to said ring; said mask having light transmitting characteristics; a first and second zone of radial opaque sections disposed at substantially equal angular increments on said mask, said sections of said zones being spaced from one another the same amount as the sections on said ring, and the zones being offset from one another by one-fourth of an interval, an interval being one clear section and one opaque section; a pair of light sensitive devices mounted on said other member, one of said light sensitive devices being positioned adjacent one of said zones and the other of said light sensitive devices being positioned adjacent the other of said zones, and both of said light sensitive devices being positioned on the sides of said mask opposite from said ring; and a source of light on said other member positioned on the side of said ring opposite from said mask and adapted to illuminate simultaneously a plurality of intervals on said ring.

6. Means for measuring relative movement between a pair of parts supported for relative movement with respect to one another, said measuring means comprising a light transmitting portion on the first of said parts adapted to move therewith, a plurality of opaque and clear sections disposed at substantially equal increments on said portion; a complementary mask portion on the other of said parts positioned adjacent to said portion on said first of said parts, said mask portion having light transmitting characteristics; a first and second zone of opaque sections on said mask portion substantially identical in width and spacing to said opaque sections of said portion on said first part with the zones being offset from one another by a fraction of the interval defined by a clear section and an adjacent opaque section; light sensitive means mounted on one of said parts adjacent to said zones; and a source of light adapted to illuminate simultaneously a plurality of intervals on said first of said parts 7. Means for measuring relative rotation between a pair of members supported for relative movement with respect to one another and for producing a digital output comprising a portion on the first of said members adapted to rotate therewith, said portion having light transmitting characteristics; opaque and clear sections of substantially the same angular width concentrically disposed at substantially equal angular increments about said portion; a complementary mask portion on the other of said members positioned adjacent to said portion on said first member, said mask portion having light transmitting characteristics; a first and second zone of opaque sections on said mask portion substantially identical in width and spacing to said opaque sections of said portion on said first member with the zones being offset from one another by a fraction of the interval defined by one clear section and an adjacent opaque section; light sensitive means mounted on said other member positioned adjacent to said zones; and light producing means on said other member adapted to illuminate simultaneously a plurality of intervals on said portion on said first of said members.

References Cited in the file of this patent

UNITED STATES PATENTS

| 2,130,296 | Caldwell | Sept. 13, 1938 |
| 2,236,255 | Young | Mar. 25, 1941 |
| 2,301,396 | Graf | Nov. 10, 1942 |
| 2,370,000 | Best | Feb. 20, 1945 |
| 2,788,519 | Caldwell | Apr. 9, 1957 |
| 2,811,043 | Bonnell | Oct. 29, 1957 |
| 2,845,710 | Claret et al. | Aug. 5, 1958 |

FOREIGN PATENTS

| 1,099,218 | France | Mar. 16, 1955 |

OTHER REFERENCES

An article "Inertial Guidance for Rocket-Propelled Missiles," by W. T. Russell from "Jet Propulsion," January 1958.